United States Patent [19]

Kosteruk et al.

[11] 3,998,632
[45] Dec. 21, 1976

[54] METAL ALLOY

[76] Inventors: Valentin Petrovich Kosteruk, ulitsa M. Krivonosa, 19, kv. 5; Mikhail Savvich Kovalchenko, ulitsa Kapitanovskaya, 10, kv. 20, both of Kiev, U.S.S.R.

[22] Filed: Dec. 5, 1974

[21] Appl. No.: 530,141

Related U.S. Application Data

[60] Division of Ser. No. 248,295, April 27, 1972, Pat. No. 3,903,585, which is a continuation of Ser. No. 875,503, Nov. 10, 1969, abandoned.

[52] U.S. Cl. .................................. 75/134 V; 29/195
[51] Int. Cl.² .......................................... C22C 27/00
[58] Field of Search ............... 75/134 V; 29/195 A, 29/195 M, 194

[56] References Cited
UNITED STATES PATENTS

| | | | |
|---|---|---|---|
| 3,438,770 | 4/1969 | Clark et al. | 75/134 V |
| 3,446,615 | 5/1969 | Hill et al. | 75/134 V |
| 3,622,308 | 11/1971 | Hill | 75/134 V |

*Primary Examiner*—R. Dean
*Assistant Examiner*—E. L. Weise
*Attorney, Agent, or Firm*—Haseltine, Lake & Waters

[57] ABSTRACT

Infusible metal alloys are employed both as a parts material and as a brazing spelter for the connection of various parts and components made of materials based upon infusible metals and compounds, ceramics, graphite and the like.

The alloys are based upon hafnium to which is added some elements selected from the subgroup B of the first group of the periodic system and some elements featuring melting point lying above 600° C selected from the third to eighth groups of the periodic system.

13 Claims, No Drawings

METAL ALLOY

This application is a Divisional application of Ser. No. 248,295, filed Apr. 27, 1972, now Pat. 3,903,585 dated Sept. 9, 1975, which is a continuation application of Ser. No. 875,503, filed Nov. 10, 1969, now abandoned.

The present invention relates to infusible metal alloys employed as a material for various parts and components and as a brazing spelter to connect various parts made of materials based on high-melting metals and metal alloys, ceramics, graphite and the like.

Use of the herein-disclosed alloy as a brazing spelter may be made in chemical and electrochemical industries for the connection of parts designed to operate in corrodents; in electrical-engineering, nuclear, aircraft and process industries for reinforcing critical and heavy-wear components parts and elements.

Known in the present state of the art are brazing alloys containing mostly silver and copper, bronze, platinum and employed for soldering or brazing such widely-used construction materials, mostly metallic, as various grades of steel and metal alloys.

However, gaining an ever-growing application at present are materials based upon high melting-point compounds such as carbides, borides, nitrides and silicides, possessing special physico-chemical properties. From these materials are usually made critical parts of various machines designed to operate under heavy conditions such as blades of gas turbines. Therefore a necessity arises for such parts to be mechanically fastened to other parts made from conventional structural materials, i.e., from various grades of steel and metal alloys. Additionally, the above reason necessitates the provision of both electrical and thermal contacts between both types of parts mentioned above.

In current use are a plurality of soldering or brazing spelters enabling a partial solving of that problem as far as parts made of graphite, titanium, zirconium, tungsten, niobium and their alloys are concerned. Thus, when soldering thorium-tungsten wire to molybdenum parts in manufacturing cathode-ray tubes, use is made of platinum and its alloys with silver and gold as a brazing compound, the melting point of the latter falling between 1400° and 1800° C.

There are also known brazing compounds based upon zirconium alloyed with vanadium, tungsten, titanium, beryllium and niobium additives, said compounds being used for braze-jointing zirconium parts with poorly fusible glasses, the melting point of the compounds lying between 1050° and 1300° C.

Palladium-based brazing spelters have a melting point ranging between 1000° and 1500° C and are utilized for braze-connection parts and components made of molybdenum, tungsten, zirconium and some heat-resistant alloys intended to operate under extra-high temperature conditions.

To provide a brazed-connection of graphite components with those made of titanium and zirconium and their alloys, use is made currently of suspensions constituted by finely comminuted powdery zirconium, titanium, molybdenum or their alloys, and by gasoline-dissolved polystyrene. The specified brazing conditions are as follows: melting point between 1200° and 1300° C, rarefaction $10^{-4}$ to $10^{-5}$ mm Hg. To obtain high-quality brazed connections of graphitic components with those made of molybdenum, zirconium, titanium and niobium, use is made of brazing spelters containing Au, Ni, Ti and Mo.

However, many of the materials based upon high-melting compounds such as boron carbonitride, boron nitride, silicon nitride, silicon carbide and many others, are not solderable with the use of available conventional brazing spelters.

Even in cases where the brazing of high-melting materials is rendered practicable, e.g. when connecting graphite with high-melting metals by using a spelter with a melting point between 1000° to 1500° C, each particular brazing spelter possesses its own melting point which is a strictly fixed constant value. Thus, brazing graphite proceeds at a temperature of from 1200° to 1300° C, each of the spelters being applicable for only a certain range of materials. For instance, a zirconium-based spelter is applicable to the brazing of a definite pair of materials, say, zirconium and poorly fusible glass.

Additionally, a majority of hitherto-to known brazing compounds have a melting point lying not above 1000° to 1300° C, this being due to these incorporating relatively low-melting substances. On this account, the pressure of the vapors of some brazing compounds at highly elevated temperatures (of the order of 1000° C) ranges within $10^{-3}$ to $10^{-4}$ mm Hg. Therefore, the application of the above-mentioned brazing spelters to high-vacuum engineering sometimes proves to be impracticable.

It is an object of the present invention to eliminate the disadvantages discussed above.

It is another object of the present invention to provide an alloy that is applicable as a material for making various parts and components and as a brazing compound for connecting various parts and components, which alloy is capable of connecting a wide variety of diverse materials based upon infusible compounds both with one another and with other infusible metals, ceramics, graphite and like materials and the various physico-chemical properties of which can be regulated to insure the best working capacity of the material of the brazed connection under given conditions.

Said object is accomplished due to the fact that the herein-disclosed alloy, according to the invention, is based upon hafnium to which is added some elements selected from the subgroup B of the 1st group of the periodic system within 2 and 30 percent of the total weight of the alloy, said elements being taken either separately or in various combinations with one another within the afore-stated weight percentage, and to which is added also some elements selected from the IIIrd to VIIIth groups of the periodic system, having a melting point lying above 600° C and taken either separately or in various combinations with one another within 2 to 21 percent of the total weight of the alloy.

The achieving of the above object has made it possible to provide an alloy that is in fact a highly versatile brazing spelter capable of the connection of components made of the most diverse high-melting materials, having a melting point regulatable within a wide temperature range and possessing the most diverse physico-chemical properties.

Hafnium, which is the base metal of the herein-proposed alloy, imparts a high adhesive property to the latter with respect to infusible materials, as well as insures a high melting point.

Additives of the elements of the subgroup B of the 1st group of the periodic system taken in a quantity of from 2 to 30 weight percent contribute to the regulation of the melting point of the herein-disclosed alloy within the required limits, whereas some additives of the elements selected from the IIIrd to VIIIth groups of the periodic system taken in an amount of from 2 to 21 weight percent are instrumental in regulating the physico-chemical properties of the alloy concerned herein.

To provide the regulation of the melting point of the alloy within the temperature range of from 1000° to 1200° C, it is advisable that the elements of the subgroup B of the Ist group of the periodic system be taken in an amount of from 20 to 30 percent of the total weight of the alloy, while the regulation of the melting point of the alloy within the range of from 1200° to 1500° C is attainable by taking the elements of the subgroup B of the Ist group of the periodic system in a quantity of from 12 to 20 percent of the total alloy weight.

Further, the regulation of the alloy melting point with in the range of from 1500° to 1800° C can be obtained by taking the elements of the subgroup B of the Ist group of the periodic system in an amount of from 8 to 12 percent of the alloy weight, whereas for the regulating of the alloy melting point within the limits of from 1800° to 2100° C the elements of the subgroup B of the Ist group of the periodic system are advantageously taken in a quantity of from 2 to 8 percent of the total alloy weight.

It is due to the above-described composition that the herein-disclosed alloy will find wide application in the most diverse branches of engineering and industry, e.g., in electronics for mechanical attachment and electrical connection of components made from infusible materials such as cathodes from lanthanum hexaboride; in chemical machine-building for attaching refractory lining and some other components made of infusible materials such as linings from silicon nitride; in electrical engineering for attaching and electrically connecting current-conducting elements such as the electrodes in electrolyzers, and for fastening insulators, e.g., those made of aluminum oxide.

The present alloy is also favorably practicable when utilized in aircraft industry, especially in cases where, in addition to mechanical linkage or attachment, airtightness is necessary as is the case in making various current leads on aircraft.

In processing industries the present alloy can find particular utility when employed for attaching various carbide-tipped heads of cutting tools, in assembling large-sized or intricate-shaped carbide-tipped tools from smaller components, for attaching refractory-composed lining in various crushers, mills, etc. Additionally, the alloy is applicable as a bond for abrasive wheels such as diamond ones. The most promising sphere of application of the present alloy is the processing industries, this being concerned with the appearance of cutting tools made not of such conventional alloys as those based upon tungsten carbide in combination with cobalt but of other infusible compounds such as borides of certain metals, since for these materials the attachment methods prove to be but slightly developed.

In the following the present invention will be made clear by virtue of specific and preferred embodiments thereof described hereinbelow.

The herein-disclosed alloy intended to be employed as a material for manufacturing various parts and components and as a brazing alloy for the connection of various components and parts based upon infusible metals and compounds, contains Hf as a base to which is added some elements of the subgroup B of the first group of the periodic system within a range of from 2 to 30 percent by weight of the alloy, taken either separately or in various combinations with one another within the above-specified limits, and some elements having a melting point lying above 600° C and selected from the third to eighth groups of the periodic system within the range of from 2 to 21 percent of the total weight of the alloy, taken either separately or in various combinations within the afore-stated limits.

The element of hafnium, a basal constituent of the present alloy, is a chemically active metal thus contributing to high adhesivity of the alloy with respect to infusible materials, its high melting temperature calling forth the high melting point of the alloy proper.

To regulate the melting point of the alloy within the required limits, there are added some elements selected from the subgroup B of the first group of the periodic system, viz. Cu, Ag and Au.

The more the herein-disclosed compound is alloyed with the afore-mentioned elements the lower its melting point.

Additionally, copper, silver and gold due to their being good brazing agents for metals "per se", add much to the adhesivity of the alloy involved.

Furthermore, Cu, Ag and Au being highly current-conductive metals, their introduction into the alloy in an amount of up to 30 percent of the total weight of the alloy results in its resistivity being reduced about three times which is of special importance when using the alloy for the purpose of electrical connections.

Said elements can be taken either separately or in any combination with one another within the limits of from 2 to 30 percent of the total weight of the alloy. Alloying of the compound with such an additive has made it possible to regulate the alloy melting point within 1000° to 2100° C. Thus, should said elements be introduced within the range of from 20 to 30 percent of the alloy weight, its melting point will be found to lie between 1000° and 1200° C, whereas for a percentage of alloying ranging between 12 and 20 the melting point will lie between 1200° and 1500° C, with that percentage ranging from 8 to 122, the melting point will be between 1500° and 1800° C and in case of 2 to 8 percent alloying the melting point will range between 1800° and 2100° C.

Introduction of such an additive taken in the afore-specified percentage has enabled the melting point of the alloy to be regulated within a wide temperature range which fact makes it possible to utilize the alloy as a brazing agent for connecting the most diverse infusible materials.

To modify the physico-chemical properties of the present alloy in a desired direction so as to provide maximum approximation of the alloy properties with those of the materials being connected that are predominant ones under the given particular conditions, one more additive is introduced into the alloy selected from the elements of the third to eighth groups of the periodic system, said elements having a melting point lying above 600° C. Thus, to connect the materials whose thermal coefficient of expansion badly differs from that of the brazing alloy, some additive of Fe, Ni and Co in an amount of from 2 to 21 weight percent allows the above coefficient of the alloy to be properly regulated.

To impart more hardness to the alloy, some boron or carbon is added.

Since some of the elements alloyed as an additive into the brazing compound have a melting point higher than that of the basal constituent of the alloy, such an additive results in a higher melting point of the alloy as a whole. This holds true particularly of tungsten.

Among the elements of the third to eighth groups of the periodic system that are concerned with the modification of the physico-chemical properties of the present alloy are: boron, aluminum, scandium, yttrium, lanthanides, carbon, silicon, germanium, titanium, zirconium, vanadium, niobium (columbium) tantalum, phosphorus, chromium, molybdenum, tungsten, manganese, technetium (masurium), rhenium, ruthenium, osmium, cobalt, nickel, rhodium, palladium, iridium and platinum.

The melting point of the alloy is approximately calculable proceeding from the assumption that the following relationship holds true of the specified weight percentage range of from 2 to 30 of the additives selected from the subgroup B of the first group of the periodic system:

$$T = T_o + 0.033 (T_i - T_o) \alpha$$

where:
$T$ — alloy melting point to be sought, ° C;
$T_o$ — melting point of the basal constituent of the alloy, viz. hafnium;
$T_1$ — melting point of the additive selected from the elements of the subgroup B of the first group of the periodic system;
$\alpha$ — total amount of the additive in weight percent.

Should the above additive selected from the elements of the subgroup B of the first group of the periodic system comprise not a single but a few elements, the afore-stated formula assumes the following form:

$$T = T_o + 0.033 \alpha \left[ T_2 + 0.01 \sum_{i=1}^{k} (T_i - T_2)C_i - T_o \right]$$

where:
$T_2$ — melting point of copper, ° C;
$T_i$ — melting point of the rest of the additives selected from the elements of the subgroup B of the first group of the periodic system, ° C;
$C_i$ — weight percentage of all the other additives selected from the elements of the subgroup B of the first group of the periodic system except for that of copper;
$\alpha$ — total weight percentage of the additive selected from the elements of the subgroup B of the first group of the periodic system in the alloy involved;
$K$ — quantity of elements selected from the subgroup B of the first group of the periodic system for the additives into the alloy involved less copper.

Variation of the alloy melting point caused by the introduction of the additive selected from the elements occurring in the third to eighth groups of the periodic system and taken in an amount of from 2 to 21 weight percent, is expressed through the following formula:

$$\Delta T = 0.01 \sum_{j=1}^{n} (T_i - T_o) ji$$

where:
$\Delta T$ — temperature variation due to the introduction of additives selected from the elements of the third to eighth groups of the periodic system, ° C
$T_i$ — melting point of each of the elements constituting the additive, ° C;
$ji$ — weight percentage of each of the elements selected from the third to eighth groups of the periodic system;
$n$ — quantity of elements selected from the third to eighth groups of the periodic system.

With due allowance for the latter formula, the expression for an approximate calculation of the melting point of the present alloy will assume the following form:

$$T = T_o + 0.033 \alpha \left[ T_2 - T_o + 0.01 \sum_{i=1}^{k} (T_i - T_2)Ci \right] + 0.01 \sum_{j=1}^{n} (T_i - T_o)ji$$

Accuracy of the alloy melting point calculation by the above formula is within ± 100° C. Thus, the above expression will assume its final form:

$$T = T_o + 0.033 \alpha \left[ T_2 - T_o + 0.01 \sum_{i=1}^{k} (T_i - T_2)Ci \right] + 0.01 \sum_{j=1}^{n} (T_i - T_o)ji \pm 100° C,$$

where:
$T$ — alloy melting point to be sought, ° C;
$T_o$ — melting point of hafnium, ° C;
$\alpha$ — total weight percentage of the additive selected from the elements of the subgroup B of the first group of the periodic system;
$T_2$ — melting point of copper, ° C;
$k$ — quantity of elements selected from the subgroup B of the first group of the periodic system except for copper;
$Ci$ — weight percentage of each of the elements included in the amount "k";
$T_i$ — melting point of each of the elements included in the amount "k", ° C;
$n$ — quantity of elements selected from the third to eighth groups of the periodic system;
$ji$ — weight percentage of each of the elements included in the quantity "n".

EXAMPLE 1

An alloy employed for brazing titanium carbide with niobium carbide has the following composition:

| Constituents of alloy | Weight percentage | Melting point of alloy constituents, °C |
|---|---|---|
| Copper | 2 | 1083 |
| Silver | 1 | 960 |
| Titanium | 5 | 1800 |
| Zirconium | 1 | 1900 |
| Hafnium | balance | 2230 |

Substituting the above-tabulated numerical values into the afore-derived formula one will obtain the melting point of the alloy under consideration:

$$T = 2230 + 0.033 \cdot 3 \ [1083 - 2230 + 0.01 \\ (960-1083)\cdot 1] + + 0.01 \ [(1800 - 2230)\cdot 5 - \\ (1900 - 2230)\cdot 1] = 2090 \pm 100°\ C.$$

EXAMPLE 2

An alloy for brazing boron carbonitride with tungsten, the resulting connection having to operate at temperatures of up to 1900° C. The alloy features a minimum amount of the additive selected from the elements of the subgroup B of the first group of the periodic system, its composition being as follows:

Cu — 2 percent
W — 5 percent
Hf — balance (93 percent).

EXAMPLE 3

An alloy for brazing lanthanum hexaboride with molybdenum in vacuum-tube apparatus, the resulting connection having to operate at temperatures of up to 1500° C with a good electrical contact obtained. To the alloy should be added up to 8 percent Cu or Ag, this additive increasing the electric conductivity of the connection about 1.5 times, whereas for approximating the properties of the material of the connection with those of the components being connected, 1 percent Yr and 2 percent W are added. Thus the alloy has the following composition:

Cu — 8 percent
Zr — 1 percent
W — 2 percent
Hf — balance (89 percent).

EXAMPLE 4

An alloy for connection of ceramics based upon aluminum oxide with molybdenum and having a melting point between 1250° and 1300° C at a maximum working temperature of the joint equal to 1000° C. The alloy has the following composition:

Cu — 16 percent
Cr — 2 percent
Ti — 5 percent
Hf — balance (77 percent).

EXAMPLE 5

An alloy for connection of materials featuring relatively low melting point such as cobalt silicide with manganese silicide. The melting point of the alloy being within the range of from 1000° to 1100° C, the maximum working temperature of the connection must be not below 900° C since these materials have to operate in media at temperatures of up to 800° C. In addition, the alloy should possess the maximum possible electric conductivity and chemical resistance. All the above requirements are met by the following composition of the alloy:

Ag — 26 percent
Nb — 1 percent
Ni — 1.5 percent
Mn — 1 percent
Hf — balance (70.5 percent).

EXAMPLE 6

If no demands are made for the material of the connection to possess high electric conductivity, when Ag as an additive may be replaced by a cheaper material such as copper. Thus, for making diamond tools, use is made of the following alloy as a bond:

Cu — 30 percent
Ti — 5 percent
Zr — 4 percent
Ni — 3 percent
Hf — balance (58 percent).

EXAMPLE 7

Au can be employed as an additive in the same cases as Cu or Ag. However, on account of the high cost of gold, it is recommended that said additive be employed in extraordinary cases only, say, in making semiconductor devices.

EXAMPLE 8

When making carbide tools the present alloy should possess not only a low melting point but also satisfactory impact strength, ductility and a suitable thermal coefficient of expansion. Thus, an alloy of the following composition is employed for connection of parts and components based upon tungsten carbide and cobalt with those made of stainless steel:

Cu — 25 percent
La — 3 percent
Co — 5 percent
Hf — balance.

The alloys of the compositions specified hereinabove can be made by the method of powder metallurgy. To this end a calculated amount of the alloy constituents taken in a powdery state is mixed with 20 weight percent of ethanol, the resultant mixture is agitated until a uniform coloring appears, whereupon it is dried at a temperature of from 40' to 60° C for 5 or 6 hours. Then the dried mixture is rubbed through a screen No. 0.056 and pressed in a steel compression mold at a pressure of 50 kg per sq. cm. Next the samples obtained are sintered for 1 hour under a vacuum of not lower than $10^{-2}$ mm Hg. This done, the samples are mechanically disintegrated until such a size of paticles is obtained that is the most suitable in every particular case but not smaller than 1 mm, since in the case of smaller particles of the alloy some undesirable side effects occur (interreaction of the alloys with the surrounding atmosphere, if brazing does not proceed under vacuum, etc.).

The herein-disclosed alloy is employed in the shape of dispersed particles having a conventional diameter of not less than 1 mm.

The dispersed particles of the alloy are applied to the place to be connected, whereupon it is given a heat of up to the melting point of the alloy (1200° to 1900° C) under vacuum not below $10^{-2}$ mm Hg, in an inert or reducing atmosphere. Once the alloy is molten, it must be kept 1 to 3 min in that state. The surface of the dispersed particles of the alloy and the parts being brazed together need be neither carefully ground nor cleaned and decreased.

The present alloy can be obtained by another method, e.g., by alloying the components in an arc or resistance furnace in an atmosphere of argon or under vacuum.

Some materials that cannot be connected together by applying present-day techniques such as boron carbonitride with tungsten, boron carbide with boron carbonitride, niobium carbide with boron carbonitride, have been brazed together with the use of the brazing alloy of the following composition (in weight percent):

Cu — 14
Nb — 9
Zr — 5
Co — 7
Hf — balance (65 percent).

Brazing temperature 1840° C under vacuum of $10^{-3}$ mm Hg.

As a result a tight connection 0.2 mm thick has been obtained. After stretching forces had been applied breakage of the test specimen occurred in the bulk of the boron carbonitride component which is indicative of the fact that the connection of the present alloy with the boron carbonitride proved to be stronger than the latter itself.

Thus, on the basis of all described and discussed herein above it can be said that the herein-proposed alloy is a versatile one as it is found to be capable of connection of even those infusible materials that hitherto could not be connected. Besides, by appropriately varying the percentage of additives in the alloy, its melting point is controllable within a wide range of temperatures and the most diverse physico-chemical properties can be imparted thereto.

What is claimed is:

1. A brazing spelter composition, especially useful for joining high melting carbides, borides, nitrides and silicides and ceramics to each other or to high melting metals, comprising an alloy consisting essentially of hafnium as a major constituent, a first additive component selected from the group consisting of copper, gold, silver and mixtures thereof, in an amount of from 2 to 30 percent of the alloy weight, and a second additive component selected from the group consisting of boron, aluminum, scandium, yttrium, lanthanides, carbon, silicon, genanium, titanium, zirconium, vanadium, niobium (columbium), tantalum, phospohorus, chromium, molybdenum, tungsten, manganese, technetium (masurium), rhenium, ruthenium, osmium, cobalt, nickel, rhodium, iridium, platinum, and mixtures thereof in an amount of 2 to 21 percent of the alloy weight.

2. A brazing spelter composition of claim 1 wherein the first component is present in an amount of from 20 to 30% of the alloy weight to provide a melting point of the alloy between 1000° and 1200° C.

3. A brazing spelter composition of claim 1 wherein the first component is present in an amount of from 12 to 20% of the alloy weight to provide a melting point of the alloy between 1200° and 1500° C.

4. A brazing spelter composition of claim 1 wherein the first component is present in an amount of from 8 to 12% of the alloy weight to provide a melting point of the alloy between 1500° and 1800° C.

5. A brazing spelter composition of claim 1 wherein the first component is present in an amount of from 3 to 8% of the alloy weight to provide a melting point of the alloy between 1800° and 1200° C.

6. A brazing spelter composition of claim 2 consisting essentially of 25% Cu, 3% La, 5% Co, and balance Hf.

7. A brazing spelter composition of claim 2 consisting essentially of 30% Cu, 5% Ti, 4% Zr, 3% Ni and balance Hf.

8. A brazing spelter composition of claim 2 consisting essentially of 26% Ag, 1% Nb, 1.5% Ni, 1% Mn, and balance Hf.

9. A brazing spelter composition of claim 3 consisting essentially of 16% Cu, 2% Cr, 5% Ti, and balance Hf.

10. A brazing spelter composition of claim 4 consisting essentially of 1% Zr, 2% W, 8% of a first component selected from Cu and Ag and the balance Hf.

11. A brazing spelter composition of claim 5 consisting essentially of 2% Cu, 1% Ag, 5% Ti, 1% Zr, and balance Hf.

12. A brazing spelter composition of claim 1 consisting essentially of 2% Cu, 5% W and balance Hf.

13. A brazing spelter composition comprising an alloy consisting essentially of hafnium as a major constituent, a component selected from the group consisting of copper, gold, silver and mixtures thereof, in an amount of from 2 to 30 percent of the alloy weight and a second component having a melting point above 600° C. and constituted of at least one element selected from groups III-VIII of the periodic system in an amount of from 2 to 21 percent of the total alloy weight.

* * * * *